C. BOARD.
BOB SLED.
APPLICATION FILED JULY 6, 1912.
1,108,322.
Patented Aug. 25, 1914.
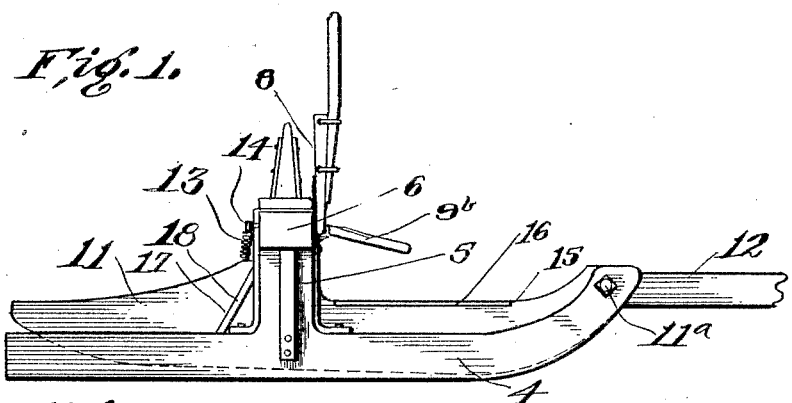
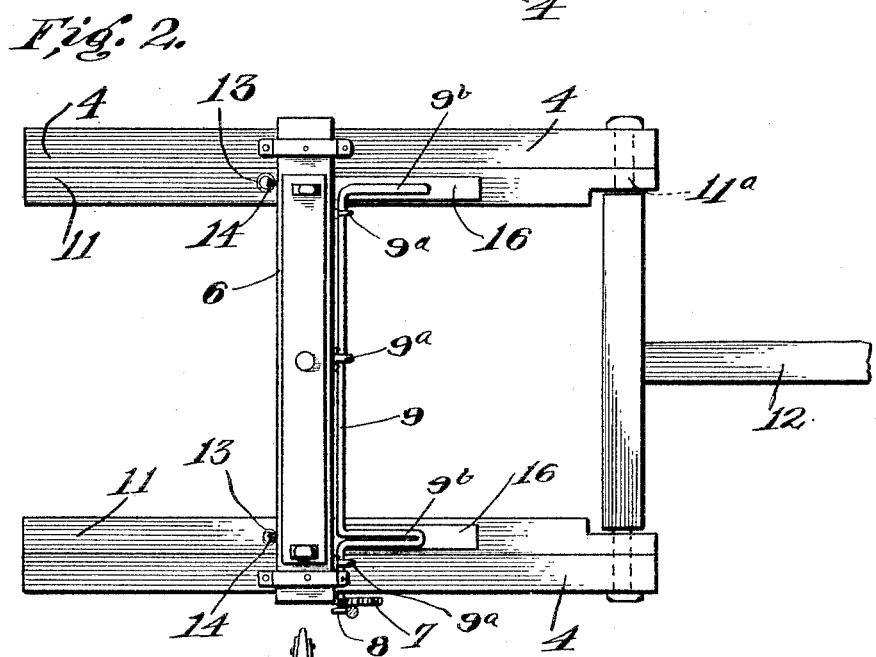
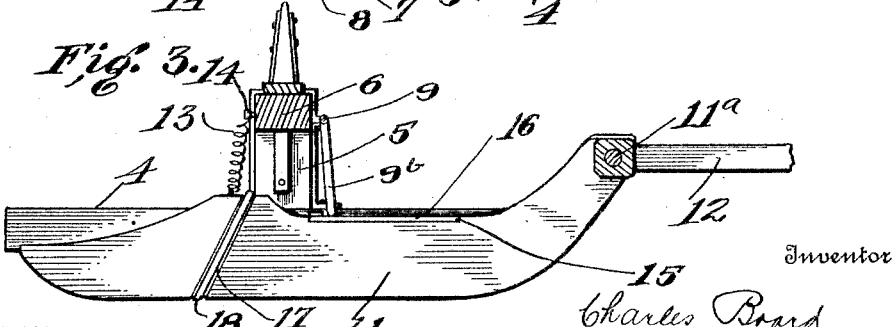
Witnesses
Inventor
Charles Board,
By Frank Saunerman,
Attorney

UNITED STATES PATENT OFFICE.

CHARLES BOARD, OF HAILEY, IDAHO.

BOB-SLED.

1,108,322.        Specification of Letters Patent.      Patented Aug. 25, 1914.

Application filed July 6, 1912. Serial No. 708,019.

*To all whom it may concern:*

Be it known that I, CHARLES BOARD, a citizen of the United States of America, and resident of Hailey, in the county of Blaine and State of Idaho, have invented certain new and useful Improvements in Bob-Sleds, of which the following is a specification.

This invention relates to bob sleds and has particular reference to a means for providing the same with a brake or drag to prevent too rapid movement of the sled when descending an inclined surface or road.

An object of this invention is to provide a bob sled having manually operated retarding means, the said retarding means comprising auxiliary runners or shoes having novel means for their movement with relation to the runners of the bob sled, the said shoes having devices thereon extending transversely around the same so that that portion of the device extending under the shoe may act as drags by engaging the surface of the roadbed or the packed snow or ice over which the sled is moved.

With the foregoing and other objects in view, the invention consists in the details of construction and in the arrangement and combination of parts to be hereinafter more fully set forth and claimed.

In describing the invention in detail, reference will be had to the accompanying drawing forming part of this specification wherein like characters denote corresponding parts in the several views, and in which—

Figure 1 illustrates a view in elevation of the side of a bob sled with the invention applied thereto; Fig. 2 illustrates a top plan view of one of the sleds. Fig. 3 illustrates a side elevation of a fragment of a bob sled with the invention applied thereto.

In these drawings 4, 4, denote the runners of a bob sled to which the standards 5, 5, are connected, the said standards supporting a bolster 6. A hand operated arm 8 extends from one end of the shaft 9, the said shaft being journaled in bearings 9ª on the bolster 6, and the parts are operative to apply the brakes. The shaft has arms 9ᵇ near each end which are adapted to operate the brake mechanism in a manner to be presently explained.

The brake mechanism includes the auxiliary runners 11 having their front ends pivoted to a bar 11ª which extends between and connects the front ends of the runners of the rear bob, the said auxiliary runners being so mounted as to oscillate freely on the cross rod. The said cross rod also acts as a connection for the coupling 12 which extends to the front bob.

Each auxiliary runner 11 is yieldingly suspended near its rear end by the spring 13, the said spring having one end connected to the auxiliary runner and the other end to the bolster by means of the hooks or bolts 14.

Each auxiliary runner is further provided with a longitudinally disposed recess 15 containing a wear plate 16 which is engaged by the end of one of the arms projecting from the shaft 9, each of said arms serving to press one of the auxiliary runners downwardly as the shaft is rotated in its bearings. Upon the reverse rotation, however, of the shaft from that which is effective to depress the auxiliary runner, the spring which is connected to the said auxiliary runner serves to elevate it to its normal position wherein the lower edge of the auxiliary runner is free of the roadbed or the surface over which the sled is traveling.

As a means for augmenting the drag or dragging action of the auxiliary runner, each of said auxiliary runners is provided with a diagonally disposed recess 17 extending along the sides and the top of the auxiliary runner, the said recess forming a seat for a metallic band 18 which is fastened in place in any appropriate manner, the said band encircling the lower edge of the auxiliary runner and being adapted to offer resistance to the travel of the sled when the auxiliary runner is depressed in the manner heretofore stated. By reason of the position of the metallic band on the auxiliary runner and its being seated in the recesses, it cannot be displaced notwithstanding portions thereof embracing the lower edge of the auxiliary runner may contact obstructions such as stones or hard projections in the roadbed. By reason of the construction just described, it will be apparent that by movement of the operating arm 8, the shaft 9 is partially rotated, thus moving the arms on the shaft to such a degree as to cause them to engage the wear plates on the auxiliary runners and owing to the provision of the quadrant, the said operating arm may be held at different positions of adjustment. Upon the removal of pressure on the auxiliary runners they are returned to the normal positions as heretofore indicated, thus a strong and durable as well as efficient braking mechanism is provided for a bob sled.

I claim—

In combination with a pair of runners having a forward connecting brace, a brake comprising auxiliary runners, each of the auxiliary runners having its forward end pivotally connected to the connecting brace, and provided with a rearwardly disposed groove in the sides thereof, the grooves of each runner being connected by a groove in the upper and lower edges thereof, a brake band in the grooves of each runner, said bands being held in the respective grooves, so that a portion of the bands will extend beyond the tread of the runner to which it is applied.

In testimony whereof, I affix my signature in the presence of two witnesses.

CHARLES BOARD.

Witnesses:
 H. A. BAKER,
 L. L. SULLIVAN.

Copies of this patent may be obtained for five cents each, by addressing the "Commissioner of Patents, Washington, D. C."